Jan. 29, 1952     A. J. BURKLIN     2,583,814
FLOW CONTROLLED WATER HEATER
Filed Oct. 31, 1947
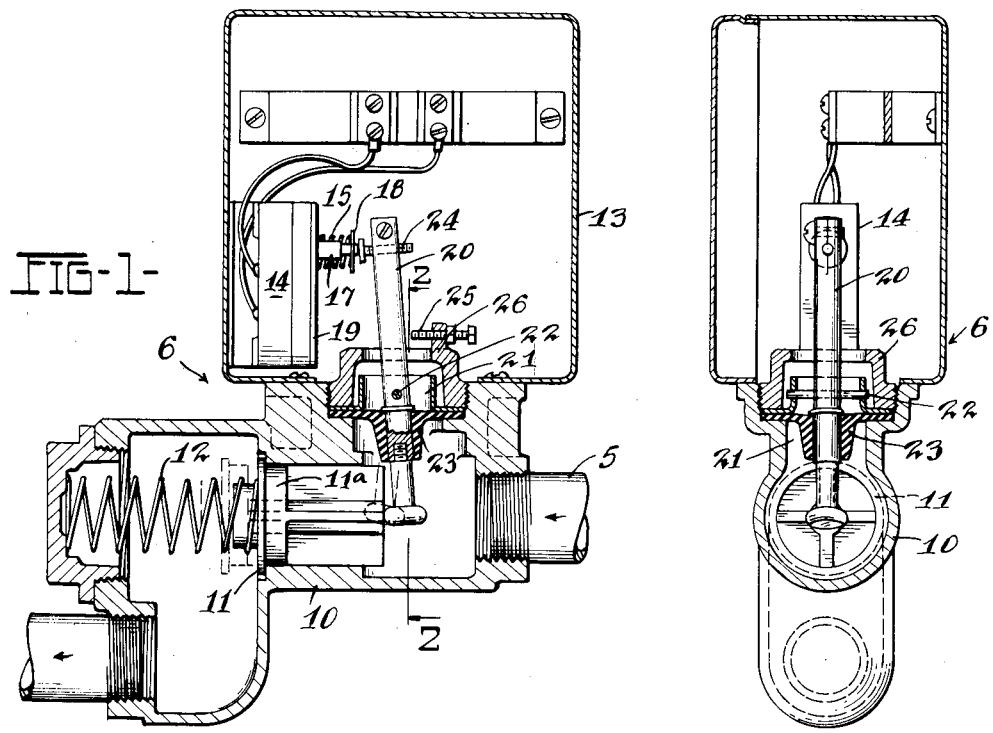
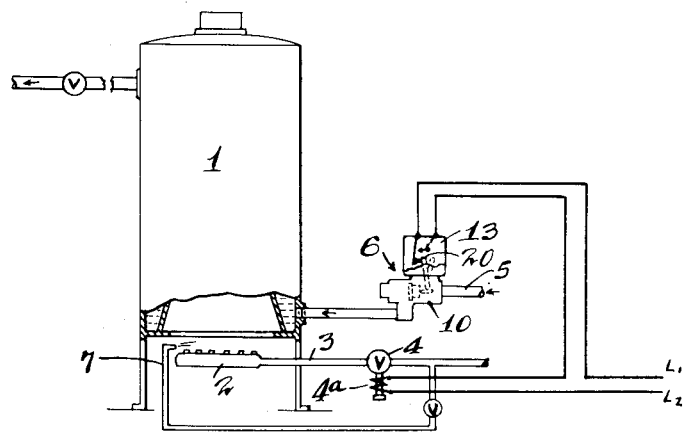
INVENTOR.
ADOLF J. BURKLIN
BY Owen & Owen
ATTYS.

Patented Jan. 29, 1952

2,583,814

UNITED STATES PATENT OFFICE 2,583,814

FLOW CONTROLLED WATER HEATER

Adolf J. Burklin, Toledo, Ohio, assignor, by mesne assignments, to A. O. Smith Corporation, Milwaukee, Wis., a corporation of New York Application October 31, 1947, Serial No. 783,326

1 Claim. (Cl. 236—25)

This invention relates to automatic flow valve controls for electric switches and particularly to such a control adapted for use in connection with water heaters whereby the heating medium for the burner is turned on when flow of water to be heated occurs.

The primary object of the invention is the provision of a control of this character wherein the switch control, instead of being positively actuated by a flow valve to open the burner control switch when water flow occurs, is permitted, by flow pressure movement of the valve, to close the control switch under the influence of other means than the water flow pressure, thereby relieving the switch control part of all water flow pressure and also removing from the flow valve any resistance to opening other than that of the customary seating spring.

Other objects and advantages of the invention will be apparent from the following detailed description, and from the accompanying drawings, in which—

Fig. 1 is a central vertical section of a switch control unit embodying the invention in association with a flow valve, with the latter closed and with parts in full; Fig. 2 is a section on the line 2—2 in Fig. 1, and Fig. 3 is a diagrammatical view of the control system in connection with a water heater.

Referring to the drawings, and particularly to Fig. 3, 1 designates a water heater, 2 a gas burner therefor, 3 the gas feed line for the burner with a solenoid control valve 4 therein, 5 a water flow line leading, in the present instance, to the heater, and 6 the control unit in which the invention resides. A pilot 7 for the burner 2 is in connection with the gas supply line 3 at the inlet side of the valve 4.

A valve casing 10 is interposed in the water flow line 5 and in this casing is mounted a flow valve 11 of plunger type normally held closed by a spring 12 and opening under water flow pressure, as well understood in the art.

Mounted on one side of the casing 10, in the present instance on its top, is a casing 13 enclosing a control switch 14 for the solenoid 4ª of the gas line valve 4. The contacts of switch 14 are normally closed, this being accomplished, in the present instance, by a coiled expansion spring 15 acting on the movable member of switch 14 which has a stem 17 projecting therefrom. The spring 15 is disposed between a shoulder or enlargement 18 on stem 17 and the switch casing 19 through which the stem projects.

A control lever 20 for the switch projects from the interior of the casing 13 into the casing 10 through an opening 21 therebetween, being fulcrumed to the casing in said opening at 22. The lever extends through and is engaged by a flexible gasket or diaphragm 23 in the opening 21, so as to seal the interior of one casing from the other. The end of the lever 20 within the casing 13 engages the end of the switch stem 17 through the medium of a set screw 24 which is adjustable in the lever to vary the position of engagement with the stem, and its other end extends into the casing 10 at the rear of the flow valve 11, relative to the direction of flow, in position to be engaged and held thereby in open switch position when the valve is closed, as shown in Fig. 1. The spring 12 is of heavier tension than the spring 15 so that movement imparted to the flow valve 11 by the spring 12 overcomes the pressure of the switch spring 15 and forces the lever into position to hold the switch open. The valve opening movement of the lever 20 is limited by engagement with a stop screw 25 mounted in a part 26 of the casing 13. As the valve 11 opens under flow pressure, it is followed by the lever 20 due to the switch closing pressure of the spring 15, and such movement of the lever is stopped by the screw 25 immediately after the closing of the switch.

It is thus apparent that the switch 14 is opened by the final closing movement of the valve when the water flow is stopped and also that the switch is permitted to close under the action of its own spring 15 during a predetermined initial opening movement of the valve, and that thereafter all connection between the valve and switch is discontinued until the valve has again moved to nearly fully closed position. In other words, there is a lost motion connection between the lever 20 and flow valve 11 which permits free relative movements thereof during predetermined portions of the opening and closing movements of the flow valve, the connection only being direct and substantially positive during the last portion of the closing movement of the valve so that opening of the switch during such movement is effected.

It is preferable but not necessary that the valve 11 remain closed during the switch opening movement thereof, so that the line 5 is not opened for the flow of water therethrough until the switch is closed. For this purpose, the valve has a cylindrical line closing portion 11ª substantially corresponding in length with the switch closing movement of the valve engaging end of the lever.

In the operation of the device, the pressure flow of water or other fluid through the line 5 will move the valve 11 against the tension of its spring 12, and the initial portion of such movement will relieve the lever 20 of the pressure which holds the switch 14 open, thus permitting a closing of such switch by spring 15 and a consequent engaging of the solenoid 4a to open the valve 4 or perform some other work. In the present instance, the turning of the valve 4 permits gas to flow to the burner which is then lighted by the pilot 7 so as to heat the flowing water. When the water flow is stopped the valve 11 returns to its seat under the action of the spring 12, and during the last portion of its seating movement it engages and moves the lever 20 to open the switch 14.

I wish it understood that my invention is not limited to any specific construction, arrangement or form of the parts, as it is capable of numerous modifications and changes without departing from the spirit of the claim.

Having thus described my invention, what I claim as new, and desire to secure by United States Letters Patent, is:

In apparatus of the class described, comprising a water heater, a casing having a water supply conduit leading to said heater, a valve in said conduit, a burner for said heater, an electrically operated control for said heater, an electric switch in circuit with said control, a spring biasing said valve to closed position, a second spring of lesser strength than the valve spring biasing said switch to closed position, a lever pivoted to said casing with one end engaging said switch and the other end engaging said valve, a lost motion connection between the valve and lever shifting the lever against the switch spring to compress the same and open said switch when the valve is closed under the greater strength of the valve spring, and said lever being released by said connection when the valve is open to shift free of the switch spring to effect closing of the switch by said switch spring and operation of the burner control, and said valve having a length corresponding in length to the switch closing movement of the valve engaging end of said lever to prevent opening of the water supply conduit by the valve until said switch is closed.

ADOLF J. BURKLIN.

REFERENCES CITED

The following references are of record in the file of this patent:

UNITED STATES PATENTS

| Number | Name | Date |
| --- | --- | --- |
| 2,007,714 | Gauger | July 9, 1935 |
| 2,244,373 | Powers | June 3, 1941 |

FOREIGN PATENTS

| Number | Country | Date |
| --- | --- | --- |
| 385,916 | Great Britain | Jan. 5, 1933 |
| 470,488 | France | June 16, 1914 |